Aug. 17, 1965  J. P. MONCURE  3,200,436
APPARATUS FOR THE REMOVAL OF CRAB CARAPACES
Filed Dec. 11, 1963
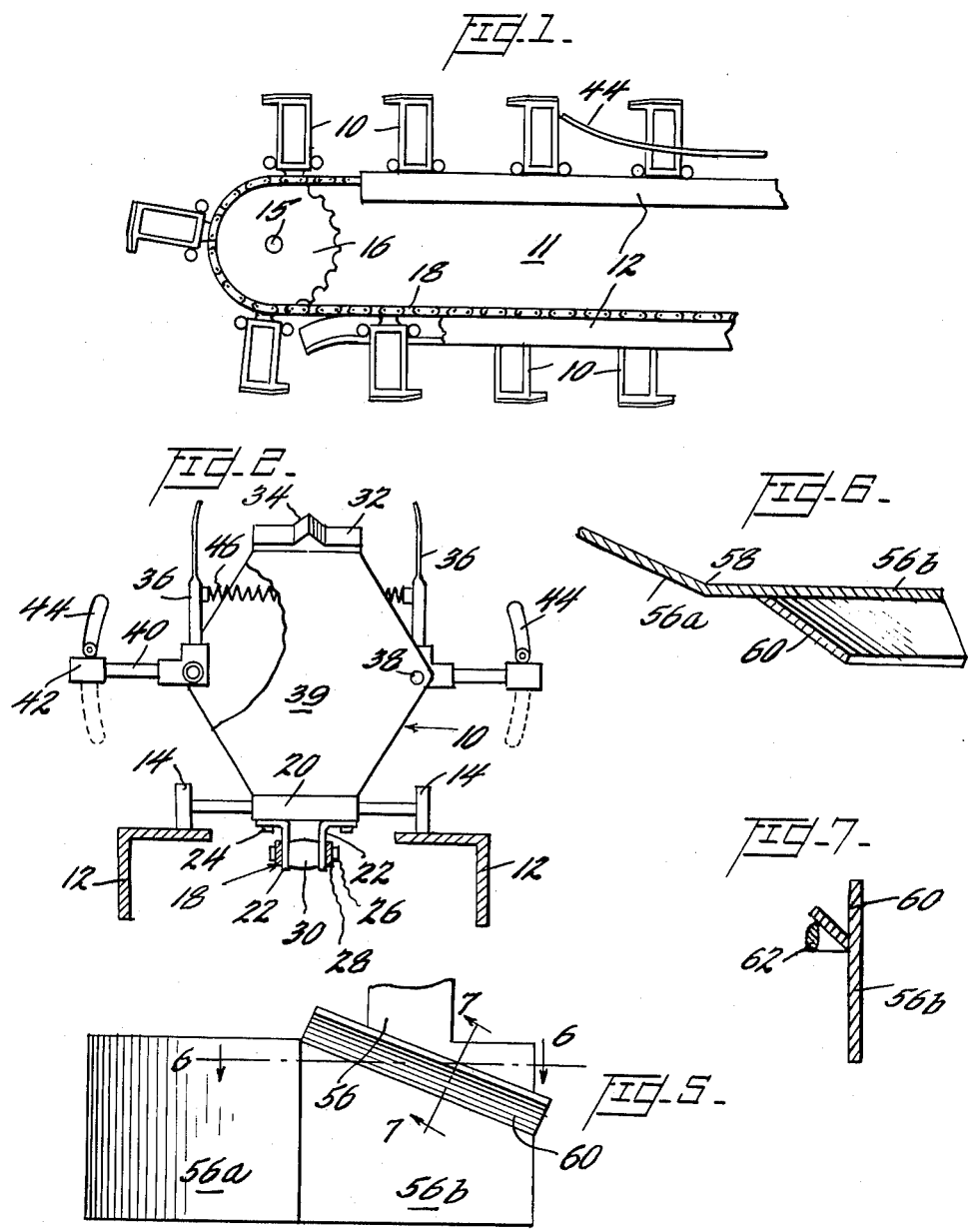
INVENTOR
Jewett P. Moncure,
BY
ATTORNEY Aug. 17, 1965  J. P. MONCURE  3,200,436
APPARATUS FOR THE REMOVAL OF CRAB CARAPACES
Filed Dec. 11, 1963  3 Sheets-Sheet 2
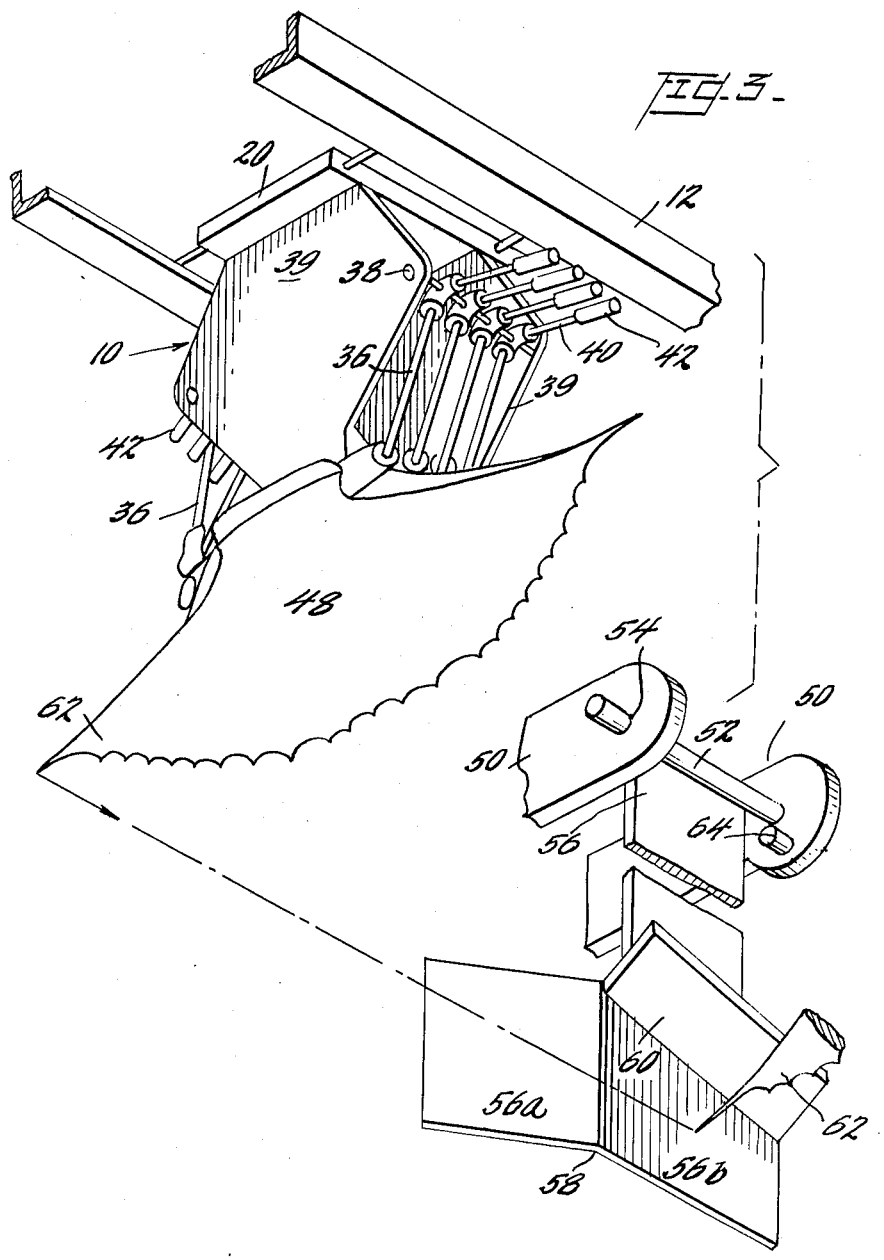
INVENTOR
Jewett P. Moncure,
BY  Robert A. Lavender
ATTORNEY

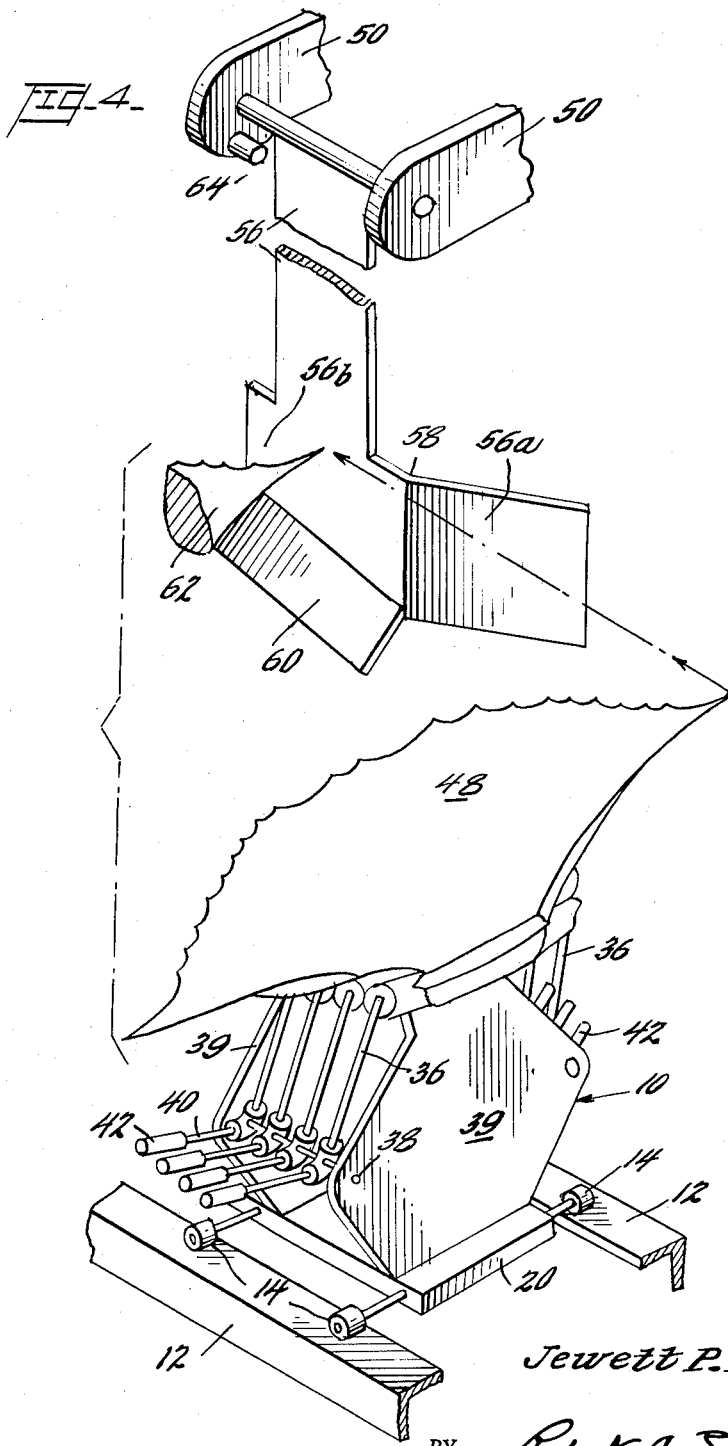

United States Patent Office 3,200,436
Patented Aug. 17, 1965

3,200,436
APPARATUS FOR THE REMOVAL OF
CRAB CARAPACES
Jewett Parker Moncure, 203 Nottingham Road,
Richmond, Va.
Filed Dec. 11, 1963, Ser. No. 329,698
8 Claims. (Cl. 17—2)

This application is a continuation in part of Patent No. 3,156,946 issued to me on November 17, 1964, on my application filed by me on April 26, 1961, Serial No. 117,250, and entitled Apparatus for Processing Crabs, in that the invention disclosed herein relates to a substitute apparatus for the separation and removal of the carapace from the crab.

This invention relates to apparatus for processing crabs and more particularly to that part of such apparatus that separates and removes the carapace from the body of the crab.

It is generally known that the carapace of a crab may be and is used as a serving dish for the food known as deviled crab. It is therefore important that the carapace be separated from the crab without being broken or otherwise divided. It is thus apparent that a machine better adapted for the separation of the carapace is one that separates the carapace from the body of the crab in an unbroken condition.

It has been found practical to separate the carapace intact from a crab by providing a sloping surface in the path of the crab as it is rigidly held while it is carried on a conveyor system, the surface being so positioned relative to the crab that one of the conical lateral ends of the carapace will engage the sloping surface as the crab is moved by the conveyor system, whereupon the carapace is broken away from the thorax of the crab.

The principal object of the invention is to provide an apparatus for separating and removing the carapace from a crab in an unbroken condition.

Another object of the invention is to provide such an apparatus that will adjust itself effectively to crabs of different sizes.

Another object of the invention is to provide such an apparatus of improved simplicity, that will reduce the cost of manufacture, operation and maintenance of such apparatus.

Other objects and advantages of the invention will be apparent from the detailed description of the invention given hereinafter and from the accompanying drawings made a part thereof in which:

FIG. 1 is a side view of a portion of a conveyor system for moving a crab along a path in a crab processing apparatus;

FIGURE 2 is a detailed front view, partly in section, of one carrying unit of the conveyor system shown in FIGURE 1;

FIGURE 3 is a view in perspective looking upward and partially along the direction of movement of a crab, showing the arrangement of parts of the invention for engaging, separating and removing the carapace of the crab while the crab is being moved along the lower run of the conveyor system;

FIGURE 4 is similar to FIGURE 3, except that the arrangement of parts are adapted to separate the carapace from a crab while it is being moved along the upper run of the conveyor system;

FIGURE 5 is a side view of surfaces for contacting and engaging a crab as it is moved by the conveyor system;

FIGURE 6 is a cross sectional view taken on line 6—6 on FIGURE 5; and

FIGURE 7 is a cross sectional view taken on line 7—7 on FIGURE 5.

Referring to FIGURES 1 and 2, 10, 10 represents a series of anvils of the conveyor system shown generally at 11. The anvils 10 are moved along a pair of rails 12 on rollers 14 by a source of power, such as an electric motor, connected to the conveyor system 11 by the shaft 15 in any conventional manner. An endless chain 18 engages sprocket wheel 16 secured on shaft 15 and is connected to the bases 20 of the anvils 10 by braces 22 bolted to the bases 20, as at 24. Bolts 26, secured by nuts 28, support rollers 30.

The anvil 10 has a flat top surface 32 upon which the crab rests, which surface 32 has a longitudinal ridge 34 thereon that is adapted to engage the ventral thoracic groove of the crab, thus enhancing the lateral stability of the crab on the anvil 10.

On each side of the anvil 10 is a series of fingers 36 which are pivoted on rods 38 journalled in the end plates 39. Arms 40, with rollers 42 thereon, extend laterally from rods 38, the rollers 42 engaging cam rods 44 (FIGURE 1). Fingers 36 are biased inwardly by springs 46.

It will thus be seen that when rollers 42 engage cam rods 44, the fingers 36 are forced outward against the force of springs 46 and a crab may be placed on the upper surface 32 of anvils 10. When the rollers 42 are not in contact with the cam rods 44, the fingers 36 are moved inwardly and engage a crab positioned on the upper surface 32 of an anvil 10 and hold the crab rigidly thereon.

Referring to FIGURE 3 and FIGURES 5 through 7, there is shown therein a crab 48 being carried on the lower run of the conveyor system 11, that is, the crab is depending from anvil 10 and is being rigidly held by fingers 36, with the back of the crab facing downwardly and substantially horizontal.

Secured to some fixed part of the apparatus and proximate to the path of the crab as it is being moved on the anvil 10, are two legs or supports 50 in which the shaft 52 is journalled, as at 54. Supported by shaft 52 and secured against relative rotation thereto is supporting plate 56 that extends downwardly from shaft 52 and is positioned normally in a generally vertical position by its own weight and that of component and connected parts thereof.

The lower portion of plate 56 is bent at an angle, as at 58, to form the guiding surface 56 *a* and the supporting surface 56*b*. On the supporting surface 56*b* is mounted a deflecting or breaking-off plate 60, which extends forwardly and at an angle to the horizontal and extends from the surface 56*b* at an angle, as shown in FIGURE 7.

The positional relation between the plate 56 and the axis of the conveyor system is such that when the plate 56 is vertical under the force of its own weight and that of its connecting plates, the axis of the conveyor system is parallel to and distant from plate 56 substantially half the width of the smallest crab that should be processed according to law. With such a positional relation existing, the conical lateral end 62 of the carapace of this smallest crab grazes the surface 56*b* and engages the deflecting plate 60 on its under side and upon further movement of the crab by the conveyor system 11, the carapace of the crab is broken from the thorax of the crab and the carapace falls away from the body of the crab under the force of gravity.

Should the crab approaching the surface 56*b* be larger than the said smallest crab, the conical lateral end 62 of the carapace first contacts the guide surface 56*a* of plate 56 and as the crab is held rigidly by the fingers 36, the lateral end 62 forces the plate 56 to swing laterally outward on shaft 52 against the force of gravity until the lateral end 62 slides along and grazes the surface 56b to engage the deflecting plate 60.

Pin 64 secured to one of the legs 50 engages plate 56 to prevent plate 56 from swinging beyond the vertical in a direction toward the line of travel of carapace lateral end 62.

Referring to FIGURE 4, the crab 48 is shown as being moved along the upper run of the conveyor system 11. Parts of the combination shown in FIGURE 3 are arranged in the same relative positions as in FIGURE 4. All corresponding parts operate and function in the same manner for the two arrangements, except that in the arrangement in FIGURE 4 the lateral end 62 engages the upper side of the deflecting plate 60 and the lateral ends of the carapace extend upwardly and away from the thorax of the crab.

When, as shown in FIGURE 3, the carapace is separated from a crab being moved along the lower run of the conveyor system 11, the carapace, as hereinbefore stated, is removed immediately from any further contact with the body of the crab by the force of gravity, but when, as shown in FIGURE 4, the carapace is separated from a crab being moved along the upper run of conveyor system 11, the carapace may continue to lie on top of and to ride along with the crab body, from which it is finally removed by gravity after its anvil 10 swings around sprocket 16 and begins its lower run.

I claim:

1. An apparatus for separating the carapace from a crab comprising: a conveyor system adapted to move said crab and adapted to hold the body of said crab rigidly thereon; and means in the path of said crab for engaging a lateral end of said carapace and adapted to deflect said end from said body and separate said carapace from said body, the said deflecting and separating means comprising a supporting plate extending in a generally vertical direction and a deflecting plate mounted on said supporting plate, the said deflecting plate extending along the surface of said supporting plate at an angle to the horizontal and extending inwardly toward the crab from said supporting plate at an angle forwardly and away relative to the direction of movement of the crab.

2. The combination set forth in claim 1 and further defined by said conveyor system consisting of: a series of anvils adapted to contact the ventral thoracic surface of the crab; fingers pivoted on said anvils and adapted to engage the lateral sides of the thorax of said crab; and resilient means on said anvils adapted to urge said fingers into intimate and firm contact with said sides.

3. The combination set forth in claim 1 and further defined by the said deflecting and separating means comprising: a supporting plate extending in a generally vertical direction; and a deflecting plate mounted on said supporting plate and extending along the said supporting plate at an angle to the horizontal and extending at an angle to said supporting plate.

4. The combination set forth in claim 3 and further defined by: a pin mounted on a fixed part of said apparatus and positioned to engage one side of said supporting plate when said supporting plate is in a generally vertical position, whereby the said supporting plate is prevented from swinging beyond the said generally vertical in one direction.

5. The combination set forth in claim 3 and further defined by: said supporting plate being pivotly mounted on a fixed part of said apparatus with the supporting surface of said supporting plate parallel to the plane of movement of said crab, whereby said deflecting plate is movable in position to engage crabs of different sizes.

6. The combination set forth in claim 3 and further defined by: said supporting plate being pivotly mounted on a fixed part of said apparatus with the supporting surface of said supporting plate parallel to the plane of movement of said crab, whereby said deflecting plate is movable in position to engage crabs of different sizes; and means for adjusting the position of said supporting plate to engage crabs of different sizes.

7. The combination set forth in claim 6 and further defined by: said adjusting means consisting of a guiding surface extending at an angle from the supporting surface of said supporting plate and adapted to engage a lateral end of the carapace of said crab, whereupon further movement of the crab by said conveyor system will move said supporting surface to a position such that the said lateral end will graze said supporting surface and engage said deflecting plate.

8. An apparatus for separating the carapace from a crab comprising: a conveyor system including crab supporting anvils and adapted to move and hold said crab rigidly thereon; a shaft journalled on said apparatus on an axis parallel and proximate to the path of said anvils; a supporting plate rigidly secured to said shaft and adapted to swing to a generally vertical position under the force of gravity; the said supporting plate having a supporting surface thereon parallel to said shaft and a guiding surface thereon at an angle to said supporting surface; a deflecting plate secured to said supporting surface extending at an angle to the horizontal; whereby said crab carried by said conveyor and contacting said guiding surface will move said supporting plate and said deflecting plate against the force of gravity acting on said plates to such a position relative to the vertical that a lateral end of said carapace of the said crab will graze along the surface of the supporting plate into engagement with the said deflection plate whereup the said carapace will be separated from the body of the said crab.

References Cited by the Examiner

UNITED STATES PATENTS 2,659,930   11—53   Jagger _____ 17—2

SAMUEL KOREN, *Primary Examiner.*

LUCIE H. LAUDENSLAGER, *Examiner.*